June 2, 1953 — G. REGET — 2,640,445
CAKE BAKING PAN MEANS AND DUMPING MECHANISM THEREFOR
Filed Aug. 31, 1951 — 2 Sheets-Sheet 1

*INVENTOR.*
George Reget
BY David Manly Heller
Attorney

June 2, 1953  G. REGET  2,640,445
CAKE BAKING PAN MEANS AND DUMPING MECHANISM THEREFOR
Filed Aug. 31, 1951  2 Sheets-Sheet 2

INVENTOR.
George Reget
BY David Manly Sellers
Attorney

Patented June 2, 1953

2,640,445

UNITED STATES PATENT OFFICE 2,640,445

CAKE BAKING PAN MEANS AND DUMPING MECHANISM THEREFOR

George Reget, Great Neck, N. Y.

Application August 31, 1951, Serial No. 244,623

14 Claims. (Cl. 107—8)

My invention appertains to improvements in cake baking pans for baking cakes of definite form and volumetric configuration.

The particular type of pan, hereinafter disclosed, is primarily utilized in a continuous baking machine and has the characteristic features of being continuously fed, or ejected and replaced by similar pans having different concavity or cavity formations, therein, and has special reference to my co-pending patent application, designated Serial #691,342, filed August 17, 1946.

An important object of my invention is to provide a baking pan, or tin, of the aforementioned character, provided with a multiplicity of cavities for defining the configuration of batter poured thereinto to form cakes of definite configuration; the said pan being provided with guide means for conveying the same on a continuous conveyor system and permitting the said pan to be inverted in its orbit of travel in order to dump or unload the finished cakes baked within the cavities, thereof.

Another object of my invention is to provide a cake baking tin, of the aforementioned character, being provided with lobe means defining toothed recess means thereinbetween to be engageable by a toothed gear-like structure for propelling the said pan around a curve preparatory to inverting the same.

A still further object of my invention is to provide a pan, of the aforementioned character, which is adapted to travel in a continuous path on an endless conveyor system and in association, therewith, suitable mechanism for maintaining the product baked, therein, during the process of inversion of the said pan until the pan is in inverted position when the products therein will be dumped or ejected therefrom.

A still further object of my invention is to provide a pan and related mechanism, of the aforementioned character, which is simple in its construction, practical in its utilitarian features as well as its operation, and one which is of such simple elemental design as to be economically produced in manufacture.

Other objects, ancillary advantages, and inherent features, resident in my invention, will be readily ascertainable from an examination of the accompanying drawings, bearing further exposition in the ensuing description, wherein like symbols are used to designate like parts, and, in which.

Figure 1:
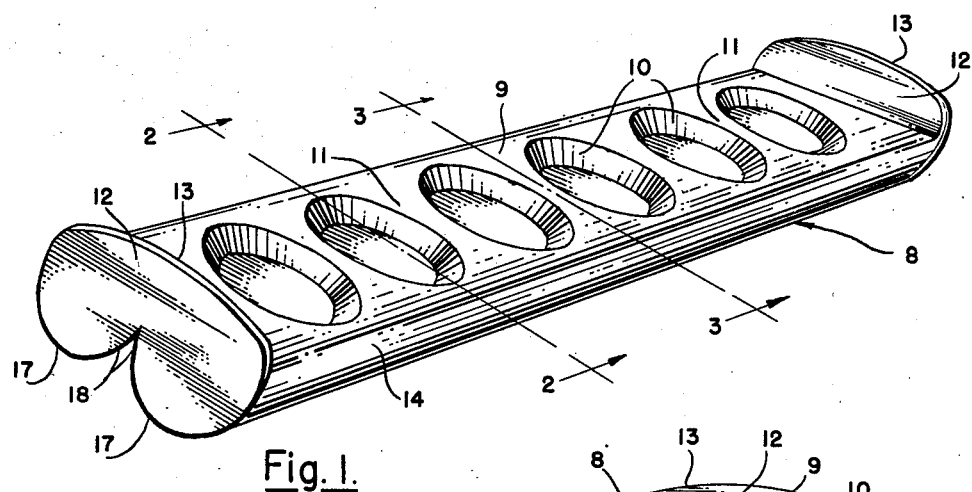
Fig. 1 is a perspective view of a baking tin comprising my invention.
Figure 3:
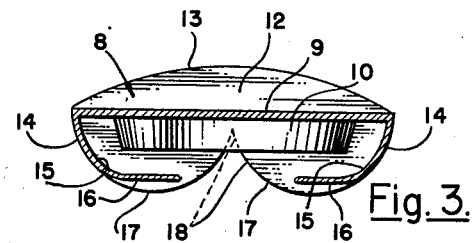
Fig. 3 is another transverse cross-sectional view taken substantially on the lines 3—3 of Fig. 1.
Figure 7:
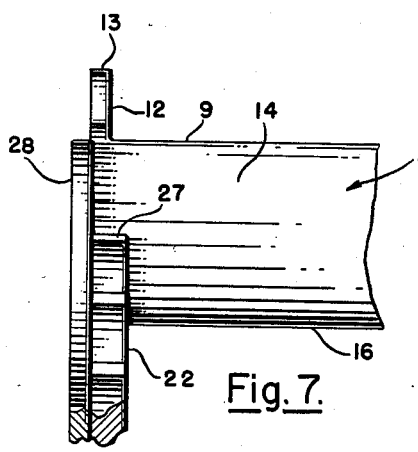
Fig. 7 is a fragmentary view looking in the direction of arrows 7—7 on Fig. 6.
Figure 2:
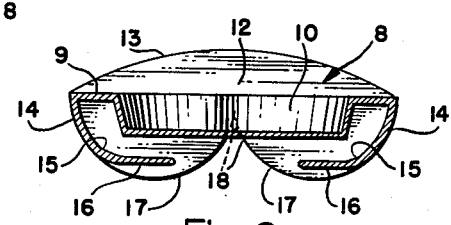
Fig. 2 is a transverse cross-sectional view taken substantially on the lines 2—2 of Fig. 1.
Figure 5:
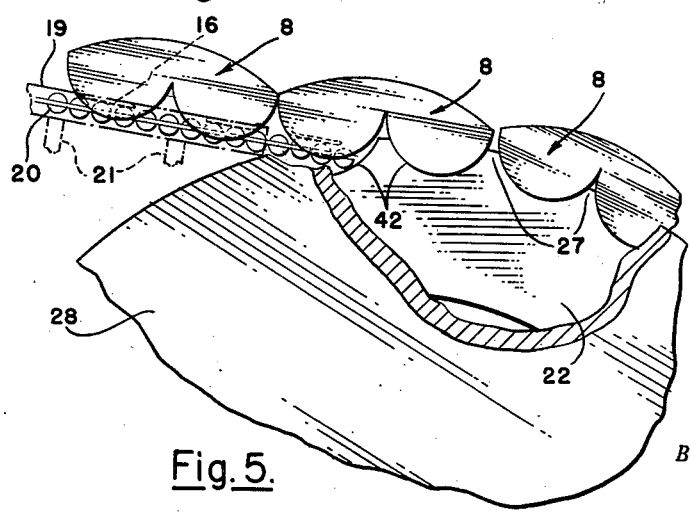
Fig. 5 is an enlarged fragmentary view of the means for propelling the pan units preparatory to inversion, thereof, and is an enlarged view of the upper portion of Fig. 4.

Referring to Figs. 1, 2 and 3, it will be noted that my invention, namely the baking pan or tin, is generally designated 8, and consists of a top portion 9 terminating in side flange portions 14, which are arcuately formed at 15 and terminate in the straight saddle portions 16, adapted to ride on the conveyor system.

The end portions, or plates, 12 extend beyond the top portion 9 and are arcuately shaped, as indicated at 13; the bottom portions, thereof, being formed into two lobe like portions 17, which extend below the saddle portions 16 and are separated by a central crotch portion 18 of angular configuration.

The top portion 9 is provided with a multiplicity of baking concavities designated 10 spaced apart to form the intermediate portions 11. Into the said cavities, batter is poured in order to define the shape of the cake to be formed, therein.

That section of the transmission mechanism for moving the pan through its endless circuitous path, having particular reference to the mechanism for inverting the pan structure, is illustrated in Figs. 4, 5, 6 and 7. Referring to those views, it will be noted that the pans 8 ride on the rollers 20 which are suitably mounted and supported on legs 21 of a framework in which the said rollers 20 are mounted.

End guard plates 19 are provided so as to laterally guide the pan and confine it to a straight path of travel.

It will be noted that the saddles 16 are in tangential contact with the upper surfaces of the rollers 20 so as to ride therealong until the mechanism is reached for inverting the pans; the inverting mechanism consists of a gear like structure 22 having spokes 23 for lightness, the same being mounted rotatably on a shaft 24, which is driven by a prime mover, not shown. It will be noted that the teeth 27 of the gear-like structure 22 are flattened at the top in order to compatibly mesh with the crotch portion 18 and allow the lobe portions 17 of the pans 8 to rest within the arcuate recesses 42 of the gear-like element 22.

About the end portion of the gear-like structure 22 and parallel to substantially one-third of its periphery, is located guard 25, which is provided with an entrance lip 26 to facilitate entry of the pans 8, having also the arcuate portions 13 thereof in tangential contact with the inner surface of the said guard 25, which terminates at 29.

The pans are thus captured between the guard element 25 and the gear structure 22 when being motivated to be subsequently inverted. The conveyor 37 is mounted on idler pulleys 30, 31, 32, 33, 34 and 35 and a tightener pulley 36 is provided for adjusting the slack of the conveyor belt 37. The belt travels in a direction indicated by arrows 38, 39 and 40 and has a portion, thereof, free to receive the cakes 41 when dumped from the pans, which are shown subsequent to dumping, as riding on the lower section 43 of the conveyor system, employing rollers 20 for returning the pans to initiate their cycle of continuous operation on the endless conveyor system, as best illustrated and described in the said co-pending application, hereinbefore mentioned. The lateral pan guiding discs 28 have their peripheries extended beyond the diameter of the gear-like element 22 so as to cooperatively assist the end guard plates 19 in maintaining the pans 8 in a fixedly defined orbit of travel throughout the entire continuous cycle.

Figure 4:
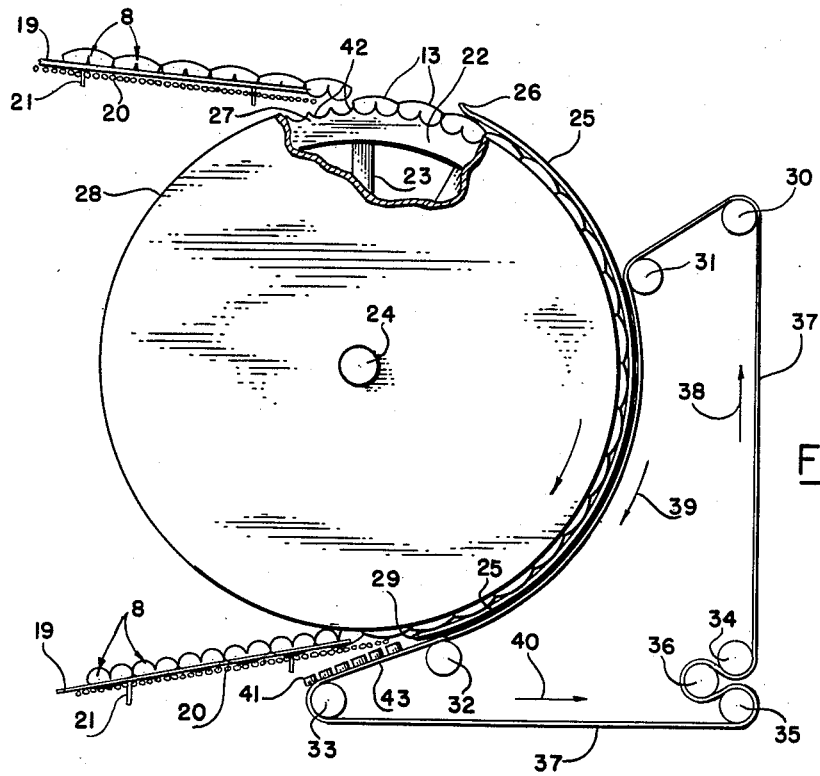
Fig. 4 is a view showing the method of transmission used for inverting the pan comprising my invention.
Figure 6:
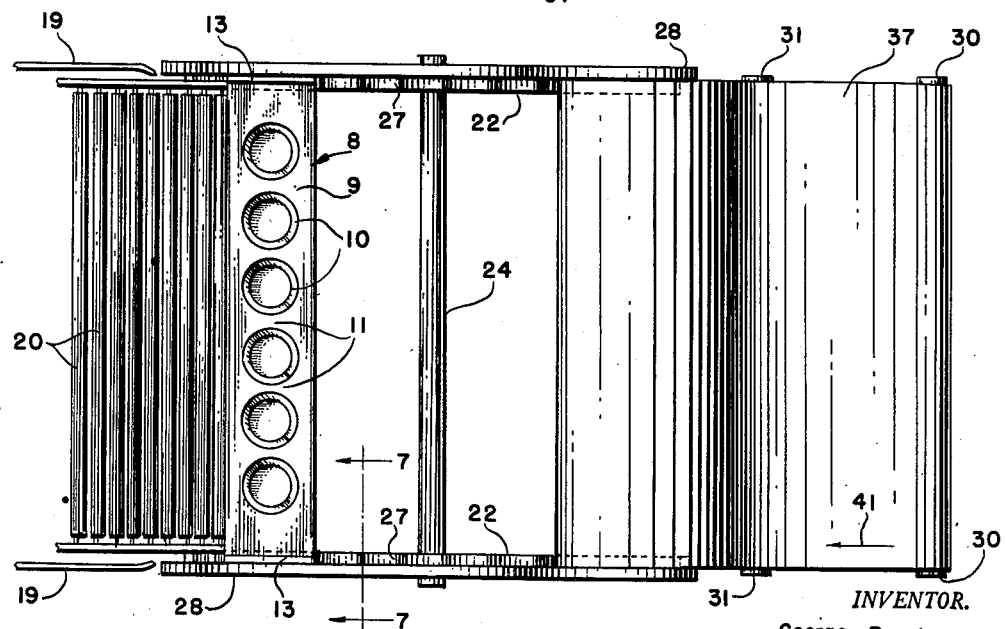
Fig. 6 is a view looking at the top of Fig. 4 with certain pans removed in order to more clearly illustrate the structural arrangement of the conveyor system elements.

The principal features of the pan, illustrated, reside in the saddle portions 16, which are adapted to ride on the rollers 20 and, when inverted, the top portion 9 rides on the rollers 20, whereas the arcuate portion 13 and the lobe portions 17 provide suitable confinement for the pans 8, when the same are going from the horizontal, through the vertical and back to the horizontally inverted position indicated in Fig. 4.

The gear-like structure 22 thus affords positive control of the pans 8 during their inversion part of the cycle of operation preparatory to ejecting the finished cakes 41 from the respective pans 8.

Although the drawings and the above specification disclose the best modes in which I have contemplated embodying my invention, I desire to be in no way limited to the details of such disclosure, for in the further practical application of my invention many changes in the form and construction thereof may be made as circumstances require or experience suggests without departing from the spirit of the invention as expounded within the scope of the appended claims.

Having thus disclosed and revealed my invention, what I claim as new and desire to secure by Letters Patent, is:

1. A cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means.

2. A cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said end portions extending beyond the said top portion and being of arcuate formation to protect cakes subsequently to their formation and baking during the inverting period of travel of the said forming and baking pan preparatory to dumping the completed cakes.

3. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said arcuate roots and the said lobe portions being meshably related.

4. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said end portions extending beyond the said top portion and being of arcuate formation to protect cakes subsequently to their formation and baking during the inverting period of travel of the said forming and baking pan preparatory to dumping the completed cakes, the said arcuate roots and the said lobe portions being meshably related.

5. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said arcuate roots and the said lobe portions being meshably related, and disc means in intimate contact with the outer surfaces of the said driving gear-like means and of greater peripheral diameter than that of the said driving gear-like means to laterally guide the said forming and baking pan during inversion.

6. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said end portions extending beyond the said top portion and being of arcuate formation to protect cakes subsequently to their formation and baking during the inverting period of travel of the said forming and baking pan preparatory to dumping the completed cakes, the said arcuate roots and the said lobe portions being meshably related, and disc means in intimate contact with the outer surfaces of the said driving gear-like means and of greater peripheral diameter than that of the said driving gear-like means to laterally guide the said forming and baking pan during inversion.

7. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said arcuate roots and the said lobe portions being meshably related, and arcuate guard means in parallelly spaced relationship with the said driving gear-like means adapted to contact the upper portions of the said end portions to confine the said forming and baking pan.

8. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said end portions extending beyond the said top portion and being of arcuate formation to protect cakes subsequently to their formation and baking during the inverting period of travel of the said forming and baking pan preparatory to dumping the completed cakes, the said arcuate roots and the said lobe portions being meshably related, and arcuate guard means in parallelly spaced relationship with the said driving gear-like means adapted to contact the upper portions of the said end portions to confine the said forming and baking pan.

9. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said arcuate roots and the said lobe portions being meshably related, and disc means in intimate contact with the outer surfaces of the said driving gear-like means and of greater peripheral diameter than that of the said driving gear-like means to laterally guide the said forming and baking pan during inversion, and arcuate guard means in parallelly spaced relationship with the said driving gear-like means adapted to contact the upper portions of the said end portions to confine the said forming and baking pan.

10. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said end portions extending beyond the said top portion and being of arcuate formation to protect cakes subsequently to their formation and baking during the inverting period of travel of the said forming and baking pan preparatory to dumping the completed cakes, the said arcuate roots and the said lobe portions being meshably related, and disc means in intimate contact with the outer surfaces of the said driving gear-like means and of greater peripheral diameter than that of the said driving gear-like means to laterally guide the said forming and baking pan during inversion, and arcuate guard means in parallelly spaced relationship with the said driving gear-like means adapted to contact the upper portions of the said end portions to confine the said forming and baking pan.

11. In combination, driving gear-like means provided with a multiplicity of spaced toothed formations defining arcuate roots therebetween, and a cake forming and baking pan for producing cakes of definite volumetric configuration comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said arcuate roots and the said lobe portions being meshably related, and arcuate guard means in parallelly spaced relationship with the said driving gear-like means adapted to contact the upper portions of the said end portions to confine the said forming and baking pan, and conveyor roller means adapted to feed the said forming and baking tin toward the said driving gear-like means, and endless conveyor means driven in the same direction as that of the said driving gear-like means and having a section thereof configurative with the said arcuate guard means but projecting therebeyond to provide a cake receiving and conveying portion.

12. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said end portions extending beyond the said top portion and being of arcuate formation to protect cakes subsequently to their formations and baking during the inverting period of travel of the said forming and baking pan preparatory to dumping the completed cakes, the said arcuate roots and the said lobe portions being meshably related, and arcuate guard means in parallelly spaced relationship with the said driving gear-like means adapted to contact the upper portions of the said end portions to confine the said forming and baking pan, and conveyor roller means adapted to feed the said forming and baking tin toward the said driving gear-like means, and endless conveyor means driven in the same direction as that of the said driving gear-like means and having a section thereof configurative with the said arcuate guard means but projecting therebeyond to provide a cake receiving and conveying portion.

13. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said arcuate roots and the said lobe portions being meshably related, and disc means in intimate contact with the outer surfaces of the said driving gear-like means and of greater peripheral diameter than that of the said driving gear-like means to laterally guide the said forming and baking pan during inversion, and arcuate guard means in parallelly spaced relationship with the said driving gear-like means adapted to contact the upper portions of the said end portions to confine the said forming and baking pan, and conveyor roller means adapted to feed the said forming and baking tin toward the said driving gear-like means, and endless conveyor means driven in the same direction as that of the said driving gear-like means and having a section thereof configurative with the said arcuate guard means but projecting therebeyond to provide a cake receiving and conveying portion.

14. In combination, driving gear-like means provided with a multiplicity of spaced toothed formations defining arcuate roots therebetween, and a cake forming and baking pan for producing cakes of definite volumetric configuration, comprising a body section including a top portion merging with depending flange portions on the sides of the said top portion and terminating in substantially right angularly formed horizontal saddle portions, a multiplicity of cake forming and baking concavities in the said top portion, a pair of end portions configurative with the said depending flange portions but extending below the said saddle portions thereof, each of said end portions being in the form of a pair of lobe portions defining intermediately thereof a crotch portion engageable by propelling means, the said end portions extending beyond the said top portion and being of arcuate formation to protect cakes subsequently to their formations and baking during the inverting period of travel of the said forming and baking pan preparatory to dumping the completed cakes, the said arcuate roots and the said lobe portions being meshably related, and disc means in intimate contact with the outer surfaces of the said driving gear-like means and of greater peripheral diameter than that of the said driving gear-like means to laterally guide the said forming and baking pan during inversion, and arcuate guard means in parallelly spaced relationship with the said driving gear-like means adapted to contact the upper portions of the said end portions to confine the said forming and baking pan, and conveyor roller means adapted to feed the said forming and baking tin toward the said driving gear-like means, and endless conveyor means driven in the same direction as that of the said driving gear-like means and having a section thereof configurative with the said arcuate guard means but projecting therebeyond to provide a cake receiving and conveying portion.

GEORGE REGET.

References Cited in the file of this patent

UNITED STATES PATENTS

| Number | Name | Date |
|---|---|---|
| 2,462,021 | Harker | Feb. 15, 1949 |
| 2,540,766 | Stilwell et al. | Feb. 6, 1951 |

FOREIGN PATENTS

| Number | Country | Date |
|---|---|---|
| 705,735 | France | Mar. 16, 1931 |